Sept. 22, 1931.   G. VORDERMARK   1,824,520
CUSHIONED VEHICLE WHEEL
Filed March 3, 1930   2 Sheets-Sheet 1
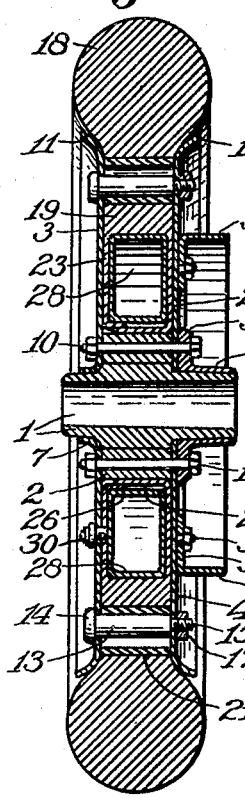
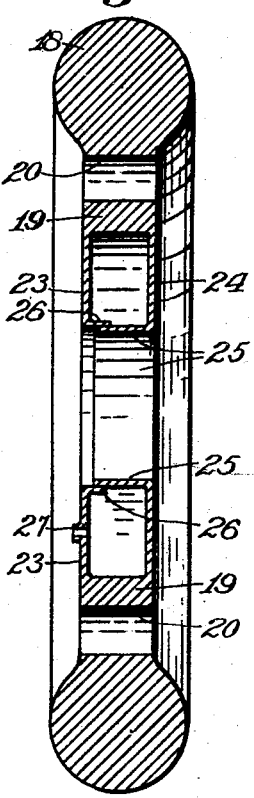
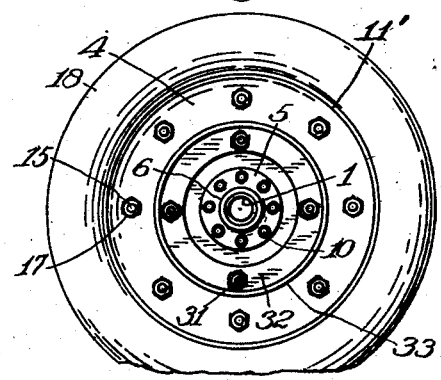
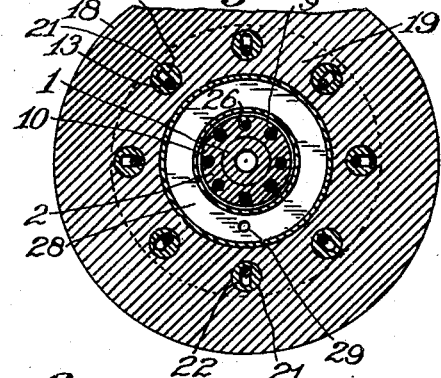
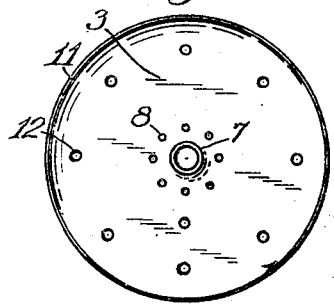
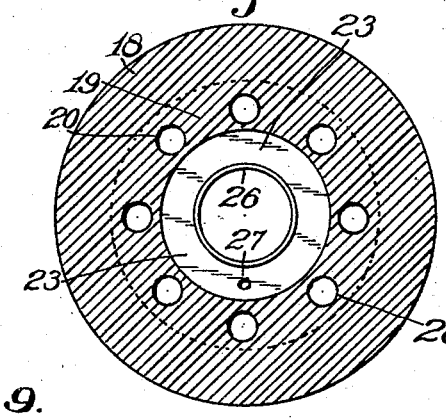
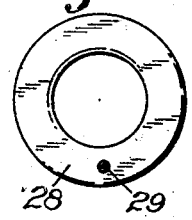
INVENTOR:
George Vordermark,
BY
E. T. Silvius,
ATTORNEY.

Sept. 22, 1931.   G. VORDERMARK   1,824,520
CUSHIONED VEHICLE WHEEL
Filed March 3, 1930   2 Sheets-Sheet 2
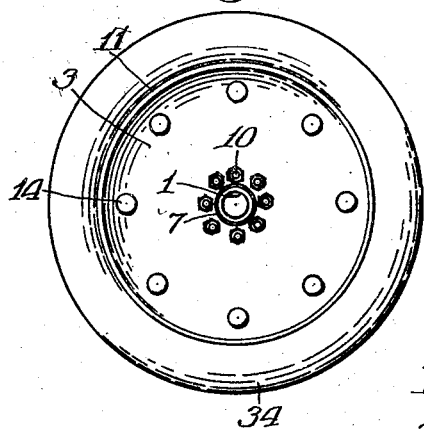
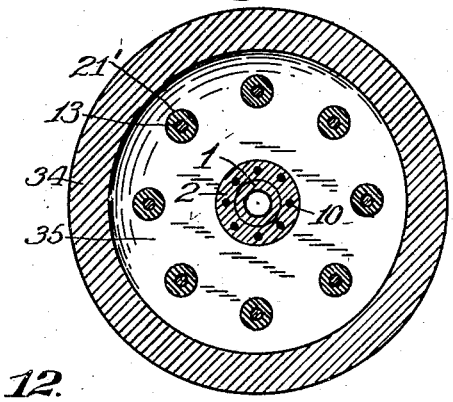
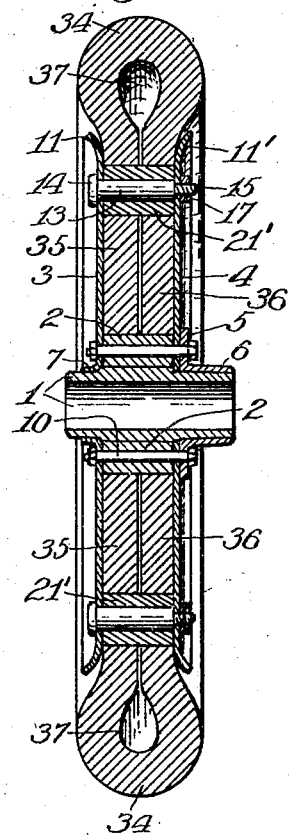
INVENTOR:
George Vordermark,
BY
E. T. Silvius,
ATTORNEY.

Patented Sept. 22, 1931

1,824,520

UNITED STATES PATENT OFFICE

GEORGE VORDERMARK, OF INDIANAPOLIS, INDIANA

CUSHIONED VEHICLE WHEEL

Application filed March 3, 1930. Serial No. 432,672.

This invention relates to a vehicle wheel of a type that is adapted for carrying the loads of motor-vehicles, especially trucks, the invention having reference more particularly to a vehicle wheel that is resilient substantially throughout or from the hub to circumference of the wheel.

An object of the invention is to provide a cushioned or resilient wheel which shall be of such construction as to have greater resiliency than that afforded by a solid rubber tire and yet not be subject to ruptures and consequent expense incidental to the use of pneumatic tires.

Another object is to provide an improved cushioned vehicle wheel which shall be so constructed as to be strong and noiseless in operation and adapted to absorb shocks on uneven roads, particularly on unpaved and roughly surfaced roads.

A further object is to provide a cushioned vehicle wheel having a resilient web portion between the hub and the rim portion of the wheel and also a non-pneumatic tire or tread portion.

A still further object is to provide an improved resilient vehicle wheel which shall be of simple construction adapted to be manufactured at low cost and permit ready repairs that might be necessitated by unavoidable breakage from accidental causes or overloading, and which shall be adapted to be durable and economical in use.

With the above-mentioned and other objects in view, the invention consists in a vehicle wheel of the disk type having novel web structure of resilient character and a resilient tire connected therewith, the invention consisting also further in the novel parts and features and in the combinations and arrangements thereof as hereinafter particularly described and further defined in the appended claims.

Referring to the accompanying drawings,—Figure 1 is a central section of the wheel as preferably constructed; Fig. 2 is a central section of the resilient tire and a novel pneumatic tube casing integrally connected therewith; Fig. 3 is a rear view of the improved wheel on a reduced scale; Fig. 4 is a section of the wheel taken on the plane of rotation of the wheel; Fig. 5 is a front view of the front one of the pair of disks comprised in the wheel; Fig. 6 is a section on the plane of rotation showing the tire and tube casing adapted to contain a pneumatic tube or air bag corresponding to an inner tube; Fig. 7 is a side view of the type of bolt preferably used in construction of the wheel; Fig. 8 is a front view of the inner tube; Fig. 9 is a perspective view of a bushing preferably provided in the web structure of the wheel; Fig. 10 is a front view of a slightly modified wheel constructed substantially in accordance with the invention without the use of a pneumatic or inner tube; Fig. 11 is a section taken centrally on the plane of rotation of the wheel; and, Fig. 12 is a section of the modified wheel on a radial plane and on an enlarged scale.

Similar reference characters in the various figures of the drawings indicate corresponding elements or features of construction herein referred to in detail.

In a practical embodiment of the invention a suitable hub is provided which may be composed of a main part 1 and a separate enlarging part 2 formed as a ring and suitably fixed to the main part, the latter as shown being simply bored and may be fixedly secured to a driving axle or shaft or may be appropriately fitted with anti-friction bearing devices enabling the wheel to rotate on an axle. Two disks or web plates 3 and 4 are spaced apart on the hub and secured thereto, the inner portion of the hub preferably being provided with a reinforcing flange 5 arranged against the rear disk 4 and having a collar 6 tightly embracing the hub. The front disk preferably has a hub flange 7 tightly embracing the front portion of the hub. Each web plate has a suitable number of bolt holes 8 and the portion 2 of the hub has corresponding bolt holes 9 to receive a suitable number of bolts 10 whereby the disks are rigidly secured to the opposite sides respectively of the portion 2 of the hub, the front disk preferably being detachable to permit renewals or repairs of parts of the wheel web. The marginal portions of the disk have flared guard portions 11 and 11' respectively, and adjacent to the guard portions the disks are each provided with a suitable number of bolt holes 12 spaced apart in a circle to receive securing bolts, each bolt comprising a body portion 13 of the required length to extend from the outer side of one of the disks to the inner side of the opposite disk and being provided with a head 14 having contact with the outer face of the front disk, each bolt having a threaded stud portion 15 projecting from its end and through the inner disk, thus affording a shoulder 16 which is seated against the rear disk and secured in place by a nut 17 on the stud portion. The bolt holes are suitably proportioned in size to afford tight fitting of the different portions of the bolt, as will be understood, the disks thus being definitely spaced apart to permit movement of resilient portions of the wheel web between the disks.

The preferred construction comprises a resilient tire 18 having a rim portion 19 of the wheel cushion integral with the inner portion thereof and provided with spaced bolt holes 20 to receive the body portions 13 of the retaining or securing bolts, the tire extending loosely about the guard portions of the disks while the rim portion is loosely embraced between the disks. Preferably the bolt holes 20 are provided with suitable bushings 21 having each a suitable opening for the body 13 of a retaining bolt, the opening preferably being broader in one direction than the other to constitute a slot 22, the bushings being so placed in the holes that the slots are radial and permitting inward movement of the cushion rim portion while the tire is on the ground. The rim portion 19 has web portions 23 and 24 spaced apart to have sliding contact with the inner sides of the disks respectively and extending inward and provided on their inner edges with flanges 25 and 26 that embrace and are supported on the hub to constitute a casing for an inner tube, one portion having a nipple 27. The flanges 25 and 26 meet and preferably over-lap to afford protection for an inner tube 28 which is placed in the casing to be inflated through an inflation tube 29 arranged in the nipple 27 and provided with a suitable inflation valve device 30 which may be of conventional character. The inner tube is composed of rubber as customary and may be circular transversely or may be approximately rectangular as illustrated. The tire and rim portion structure may be made of any suitable rubber composition and may have suitable fabric reinforcement as may be required or desired to afford necessary density and resiliency.

The rear disk 4 may be provided with studs 31 with nuts whereby an annular base plate 32 is secured to the disks, the plate having a brake drum 33 thereon.

The modified form is structurally similar to the preferred form excepting that resiliency of the wheel web is obtained at relatively less cost without the pneumatic cushion, a composition rubber tire 34 being arranged to loosely surround the flared guard portions 11 and 11' of the disks, the tire having web portions 35 and 36 that extend between the disks inward to the hub, the web portions adjacent to the tire constituting a rim portion in which the retaining bolt body 13 is received, preferably in resilient bushings 21' inserted in the rim portion and composed preferably of rubber or an elastic rubber composition to permit slight movement of the tire and the rim portion and obtain benefit of resilient action of the web portions. Preferably the tire is hollow so as to have an air chamber 37 therein. The tire and the web portions that are integral therewith may be composed of any suitable rubber composition with conventional reinforcement therein, and the chamber 37 may be filled with suitable elastic substance if desired.

In practical use, the wheel hub carries the load which forces the disks shiftingly downward as the wheel rolls on the ground, the downward movement however, being slight, but in case the tire rolls over stones or high places in the road the under portion of the tire and the rim portion rises accordingly to a limited extent and compresses the web portion that may at the time be below the hub. The wheel is well adapted for use on modern paved roads while adapted to absorb the shock imposed by unpaved roads or those that may not be smoothly surfaced.

What is claimed is:

1. A cushioned vehicle wheel including a hub, two disks spaced apart on the hub and secured thereto, the disks having flared marginal guard portions, an annular resilient rim portion arranged between the disks and having a resilient tire integral therewith, the rim portion having cushioned support on the hub, the tire extending loosely about the flared portions, and retaining bolts extending shiftably through the rim portion and secured to the disks.

2. A cushioned vehicle wheel having a hub, two separate disks secured to the hub and having flared edge portions, an annular cushioning web structure surrounding and resiliently supporting the hub between the disks, a resilient rim portion directly supporting the web structure and having a tire integral therewith, the rim portion having resilient bushings therein, and retaining bolts shiftable in the bushings and fixedly secured to the disks.

3. A cushioned vehicle wheel including a hub, two separate web disks secured to the hub and having flared marginal guard portions, a resilient tire extending loosely about the flared portions, a resilient rim portion integral with the tire and arranged between the disks, the rim portion having two casing sides integral therewith, and extending inward along the disks and to the hub, the casing sides having flanges on their inner portions extending each towards the other on the hub, elastic bushings set into the rim portion, and having radial slots, retaining bolts arranged in the said slots and extending through the disks and being directly secured to one of the disks, and a pneumatic tube arranged between the rim portion and said casing sides and bearing on said flanges.

4. A cushioned vehicle wheel including a hub, two separate web disks secured to the hub and having flared marginal guard portions, a resilient tire extending loosely about the flared portions and having an annular rim portion integral therewith, the rim portion being resilient and in sliding contact with the disks and having two side members integral therewith and extending inward along the disks and to the hub, bushings set into the rim portion and extending to the disks, and retaining bolts arranged in the bushings and extending through the disks, the bolts being secured to the disks.

In testimony whereof, I affix my signature on the 25th day of February, 1930.

GEORGE VORDERMARK.